(12) United States Patent
Lo et al.

(10) Patent No.: US 10,326,351 B2
(45) Date of Patent: Jun. 18, 2019

(54) SWITCHING REGULATOR AND CONTROL CIRCUIT THEREOF

(71) Applicant: RICHTEK TECHNOLOGY CORPORATION, Zhubei, Hsinchu (TW)

(72) Inventors: Li-Di Lo, Zhubei (TW); Isaac Y. Chen, Zhubei (TW); Chien-Fu Tang, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/123,135

(22) Filed: Sep. 6, 2018

(65) Prior Publication Data

US 2019/0140534 A1    May 9, 2019

(30) Foreign Application Priority Data

Nov. 6, 2017  (TW) .............................. 106138341 A (51) Int. Cl.
| | | |
|---|---|---|
| *H02M 1/08* | (2006.01) | |
| *H02M 1/088* | (2006.01) | |
| *H02M 1/32* | (2007.01) | |
| *H02M 3/158* | (2006.01) | |
| *H02M 1/00* | (2006.01) | |

(52) U.S. Cl.
CPC ............. *H02M 1/088* (2013.01); *H02M 1/32* (2013.01); *H02M 3/158* (2013.01); *H02M 2001/0048* (2013.01)

(58) Field of Classification Search
CPC .......... H02M 1/08; H02M 1/088; H02M 1/32; H02M 1/36; H02M 1/156; H02M 1/158; H02M 2001/0048
See application file for complete search history.

(56) References Cited

U.S. PATENT DOCUMENTS

| | | | | |
|---|---|---|---|---|
| 7,701,188 B2* | 4/2010 | Kojima | ............... | H02M 3/1588 323/225 |
| 8,508,203 B2* | 8/2013 | Tang | ...................... | H02M 1/38 323/223 |
| 8,786,267 B2* | 7/2014 | Lu | ....................... | H02M 3/1588 323/271 |
| 2014/0292392 A1* | 10/2014 | Akahane | .......... | H03K 17/04123 327/333 |

* cited by examiner

*Primary Examiner* — Matthew V Nguyen
(74) *Attorney, Agent, or Firm* — Tung & Associates (57) ABSTRACT

A switching regulator includes: a controller power ON reset (POR) circuit, a controller post-POR signal generation circuit, and a pulse width modulation (PWM) signal generation circuit. The controller post-POR signal generation circuit switches the controller post-POR signal to a ready level after a controller pre-POR signal is switched to a controller reset-accomplished level and a driver signal starts switching levels to operate a power switch. The PWM signal generation circuit sets a duty ratio of a PWM signal to a predetermined minimum duty ratio after the controller pre-POR signal is switched to the controller reset-accomplished level and before the controller post-POR signal is switched to a ready level.

24 Claims, 7 Drawing Sheets

US 10,326,351 B2

SWITCHING REGULATOR AND CONTROL CIRCUIT THEREOF

CROSS REFERENCES

The present invention claims priority to TW 106138341 filed on Nov. 6, 2017.

BACKGROUND OF THE INVENTION

Field of Invention

The present invention relates to a switching regulator and control circuit thereof; particularly, it relates to a switching regulator that is capable of confirming the operating state of a driver circuit. The present invention also relates to a control circuit for the switching regulator.

Description of Related Art

Figure 1A:
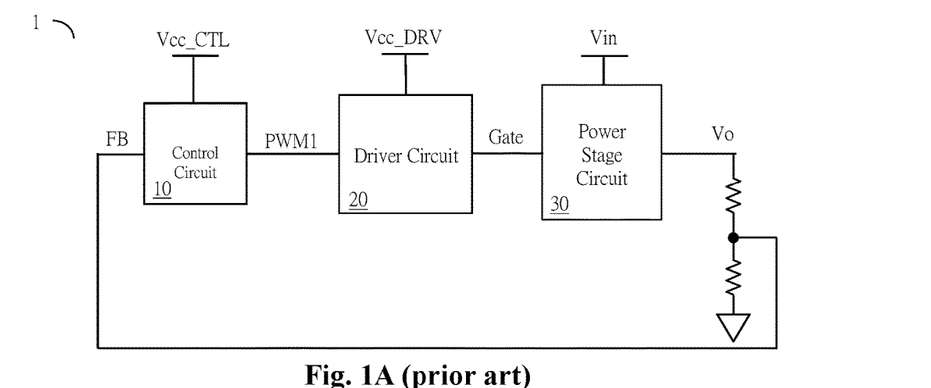
FIG. 1A shows a schematic diagram of a conventional switching regulator 1.

FIG. 1A shows a schematic diagram of a conventional switching regulator (switching regulator 1). The switching regulator, which converts an input voltage to an output voltage Vout, includes a control circuit 10, a driver circuit 20, and a power stage circuit 30. The control circuit 10 generates a pulse width modulation (PWM) signal PWM1 according to a feedback signal FB related to the output voltage Vo. The driver circuit 20 generates a driver signal Gate according to the PWM signal PWM1. The power stage circuit 30 receives the driver signal Gate and controls at least one power switch to convert the input voltage Vin to the output voltage Vo.

Figure 1B:
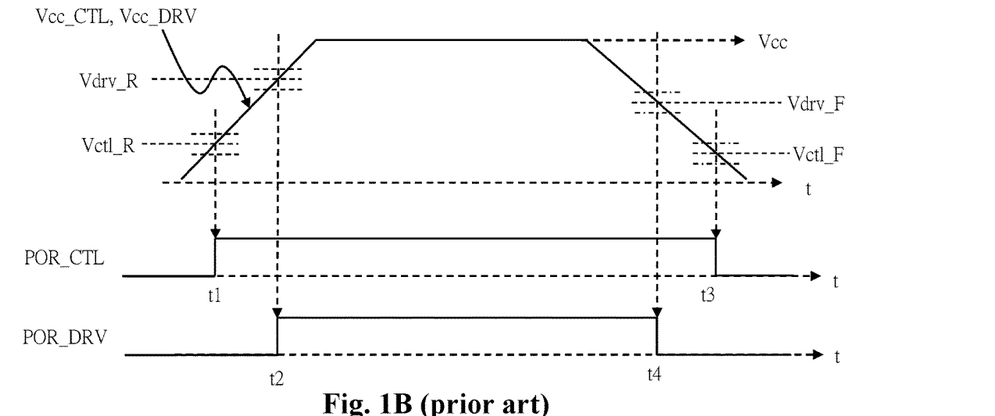
FIGS. 1B and 1C show schematic diagrams of the characteristic curves of the controller voltage supply Vcc_CTL of the switching regulator 1 and the driver voltage supply Vcc_DRV according to the prior art.

During the power-ON reset (POR) process of the switching regulator 1, a controller voltage supply Vcc_CTL supplies power to the control circuit 10, and a driver voltage supply Vcc_DRV supplies power to the driver circuit 20. In the POR process, both the controller voltage supply Vcc_CTL and the driver voltage supply Vcc_DRV are at low voltage level and need to rise from e.g. ground potential, to a predetermined operational voltage level. The predetermined operational voltage level of the controller voltage supply of the control circuit 10 may be the same as or different from the predetermined operational voltage level of the driver voltage supply of the driver circuit 20, depending on practical requirements. On the other hand, during the power-off process of the switching regulator 1, the controller voltage supply Vcc_CTL and the driver voltage supply Vcc_DRV decrease from the predetermined operational voltage levels to a low voltage level, such as ground potential As shown in FIG. 1B, assuming that the predetermined operational voltage level of the controller voltage supply of the control circuit 10 is the same as the predetermined operational voltage level of the driver voltage supply of the driver circuit 20, and both are the predetermined voltage Vcc, and both the controller voltage supply Vcc_CTL and the driver voltage supply Vcc_DRV rises and falls by the same slope. As shown in FIG. 1B, in the POR process, when the voltage level of the controller voltage supply Vcc_CTL rises above a controller POR rising threshold Vctl_R at the time point t1, the control circuit 10 switches the controller POR signal POR_CTL to a controller reset-accomplished level (for example, a high level), which indicates that the initialization process of the internal circuitry of the control circuit 10 is finished, and a start-up operation such as a soft-start operation may start. The upper and lower dotted parallel lines around the controller POR rising threshold Vctl_R indicates that there may be an error in the controller POR rising threshold Vctl_R.

Similarly, in the POR process, when the voltage level of the driver voltage supply Vcc_DRV rises above a driver POR rising threshold Vdrv_R at the time point t2, the driver circuit 20 switches the driver POR signal POR_DRV to a driver reset-accomplished level (for example, a high level), which indicates that the initialization process of the internal circuitry of the driver circuit 20 is finished, and a start-up operation such as a soft-start operation may start. The upper and lower dotted parallel lines around the driver POR rising threshold Vdrv_R indicates that there may be an error in the driver POR rising threshold Vdrv_R.

On the other hand, as shown in FIG. 1B, in the power off process, when the voltage level of the controller voltage supply Vcc_CTL falls below the controller POR falling threshold Vctl_F at the time point t3, the control circuit 10 switches the controller POR signal POR_CTL to a controller reset level (for example, a low level) to indicate the circuit reset state of the internal circuitry of the control circuit 10. The upper and lower dotted parallel lines around the controller POR falling threshold Vctl_F indicates that there may be an error in the controller POR falling threshold Vctl_F.

Similarly, in the power off process, when the voltage level of the driver voltage supply Vcc_DRV falls below the driver POR falling threshold Vdrv_R at the time point t4, the driver circuit 20 switches the driver POR signal POR_DRV to the driver reset level (for example, the low level) to indicate the circuit reset state of the internal circuitry of the driver circuit 20. The upper and lower dotted parallel lines around the driver POR falling threshold Vdrv_F indicates that there may be an error in the driver POR falling threshold Vdrv_R.

The prior art the switching regulator has the following drawbacks. First, when the controller POR rising threshold Vctl_R is lower than the driver POR rising threshold Vdrv_R, as shown in FIG. 1B, the time point t1 is earlier than the time point t2, that is, the start-up operation of the control circuit 10 starts earlier than the start-up operation of the driver circuit 20; in this case, the control circuit 10 will keep increasing the duty ratio of the PWM signal PWM1 before the driver circuit 20 completes its start-up operation, and when the start-up operation of the driver circuit 20 is completed, a large inrush current will flow into the power stage circuit 30 to damage the circuit. Although the control circuit 10 may have a soft-start mechanism, it is still possible that the driver circuit 20 has not yet completed start-up operation before the soft-start of the control circuit 10 is finished, so it is still possible for the power stage circuit 30 to receive a high inrush current.

In addition, when the controller POR falling threshold Vctl_F is lower than the driver POR falling threshold Vdrv_F, as shown in FIG. 1B, the time point t3 is later than the time point t4, that is, the power off operation of the control circuit 10 is later than that of the driver circuit 20; in this case, after the driver circuit 20 is power off, the output voltage Vo may suddenly drop, causing the control circuit 10 to trigger a protection mechanism, which may damage the circuit.

Figure 1C:
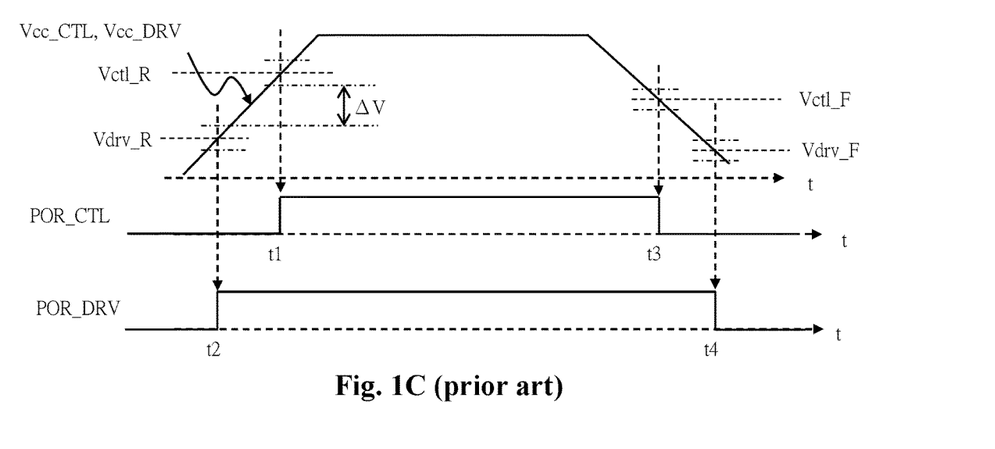

In order to avoid the aforementioned drawbacks, in another prior art switching regulator the controller POR rising threshold Vctl_R is set higher than the driver POR rising threshold Vdrv_R, and the controller POR falling threshold Vctl_F is set higher than the driver POR falling threshold Vdrv_F. As shown in FIG. 1C, since the controller POR rising threshold Vctl_R is set higher than the driver POR rising threshold Vdrv_R, the time point t1 is later than the time point t2; and since the controller POR falling threshold Vctl_F is set higher than the driver POR falling threshold Vdrv_F, the time point t3 is earlier than the time point t4.

However, such a solution needs to take into account the error ranges of the controller POR rising threshold Vctl_R and the driver POR rising threshold Vdrv_R, and ensure that the voltage difference ΔV between the controller POR rising threshold Vctl_R and the driver POR rising threshold Vdrv_R is enough to cope with the errors so that the controller POR rising threshold Vctl_R is definitely higher than the driver POR rising threshold Vdrv_R. As shown in FIG. 1C, the voltage difference ΔV must be sufficient to ensure that the controller POR rising threshold Vctl_R is higher than the driver POR rising threshold Vdrv_R. And, there is a similar situation between the controller POR falling threshold Vctl_F and the driver POR falling threshold Vdrv_F.

Thus, the predetermined voltage supply Vcc must be high enough to ensure that the circuit can function correctly, and therefore, the predetermined voltage supply Vcc cannot be lowered, and the circuit has to consume high power which is disadvantageous. In addition, the settings of the controller POR rising threshold Vctl_R, the driver POR rising threshold Vdrv_R, the controller POR falling threshold Vctl_F, and the driver POR falling threshold Vdrv_F are restricted in limited ranges, which is not flexible to a designer. Moreover, when the predetermined operational voltage level of the controller voltage supply of the control circuit 10 is different from the predetermined operational voltage level of the driver voltage supply of the driver circuit 20, the complexity of the circuit design is even higher, and the application range of the switching regulator 1 is even more limited.

In view of the above, to overcome the drawbacks of the prior art, the present invention provides a switching regulator and a control circuit, which can reduce the power consumption of the prior art, and improve the application range of the switching regulator and the control circuit thereof.

SUMMARY OF THE INVENTION

From one perspective, the present invention provides a switching regulator, which is configured to operably convert an input voltage to an output voltage, the switching regulator comprising: a power stage circuit, which is configured to operably control at least one power switch therein to convert the input voltage to the output voltage according to a driver signal; a driver circuit, which is coupled to the power stage circuit, and is configured to generate the driver signal according to a pulse width modulation (PWM) signal; and a control circuit, which is coupled to the driver circuit and the power stage circuit, the control circuit including: a controller power ON reset (POR) circuit, which is configured to switch a pre-controller signal POR to a controller reset-accomplished level when a voltage level of a controller voltage supply rises above a controller POR rising threshold; a controller post-POR signal generation circuit, which is coupled to the controller POR circuit and the driver circuit, wherein after the controller pre-POR signal is switched to the controller reset-accomplished level, the controller post-POR signal generation circuit is configured to switch a controller post-POR signal to a ready level according to the driver signal after the driver signal starts switching levels according to the PWM signal to operate the power switch; and a PWM signal generation circuit, which is configured to generate the PWM signal according to a feedback signal related to the output voltage and the controller post-POR signal; wherein the PWM signal generation circuit sets a duty ratio of the PWM signal to a predetermined minimum duty ratio after the controller pre-POR signal is switched to the controller reset-accomplished level and before the controller post-POR signal is switched to the ready level.

From another perspective, the present invention provides a control circuit for a switching regulator, wherein the switching regulator is configured to convert an input voltage to an output voltage, the switching regulator comprising: a power stage circuit, which is configured to switch a least power switch according to a driver signal to convert the input voltage to the output voltage; a driver circuit, which is coupled to the power stage circuit, and is configured to generate the driver signal according to a pulse width modulation (PWM) signal; and the control circuit, the control circuit comprising: a controller power ON reset (POR) circuit, which is configured to switch a pre-controller signal POR to a controller reset-accomplished level when a voltage level of a controller voltage supply rises above a controller POR rising threshold; a controller post-POR signal generation circuit, which is coupled to the controller POR circuit and the driver circuit, wherein after the controller pre-POR signal is switched to the controller reset-accomplished level, the controller post-POR signal generation circuit is configured to switch a controller post-POR signal to a ready level according to the driver signal after the driver signal starts switching levels according to the PWM signal to operate the power switch; and a PWM signal generation circuit, which is configured to generate the PWM signal according to a feedback signal related to the output voltage and the controller post-POR signal; wherein the PWM signal generation circuit sets a duty ratio of the PWM signal to a predetermined minimum duty ratio after the controller pre-POR signal is switched to the controller reset-accomplished level and before the controller post-POR signal is switched to the ready level.

In one preferable embodiment, the driver circuit includes: a driver POR circuit, which is configured to switch a driver POR signal to a driver reset-accomplished level when a voltage level of a driver voltage supply rises above a controller driver rising threshold; and a driver signal generation circuit, which is coupled to the driver POR circuit and the PWM signal generation circuit, and is configured to generate the driver signal according to the driver POR signal and the PWM signal.

In one preferable embodiment, the controller post-POR signal generation circuit includes a latch circuit, wherein the latch circuit is reset according to the controller pre-POR signal, and is configured to latch a switching operation signal related to the driver signal according to a clock signal, so as to generate the controller post-POR signal.

In one preferable embodiment, the clock signal preferable includes the PWM signal.

In one preferable embodiment, the PWM signal generation circuit includes: a preliminary circuit, which is coupled to the controller post-POR signal generation circuit, and is configured to generate a preliminary signal according to the controller post-POR signal and the feedback signal; and a determination circuit, which is coupled to the preliminary circuit, and is configured to generate the PWM signal according to the preliminary PWM signal and a clock signal.

In one preferable embodiment, the preliminary circuit is further coupled to the controller POR circuit and is further configured to generate a minimum PWM signal as the clock signal according to the controller pre-POR signal so that the determination circuit sets the duty ratio of the PWM signal to the predetermined minimum duty ratio before the controller post-POR signal is switched to the ready level.

In one preferable embodiment, when the voltage level of the controller voltage supply falls below a controller POR falling threshold, the controller POR circuit switches the controller pre-POR signal to a controller reset level and the post-controller generation circuit switches the controller POR signal to a not-ready level.

In one preferable embodiment, the driver POR circuit switches the driver POR signal to a driver reset level when the voltage level of the driver voltage supply falls below a driver POR falling threshold, and the PWM signal generation circuit sets the duty of the PWM signal to the predetermined minimum duty ratio after the driver POR signal is switched to the driver reset level and before the controller pre-POR signal is switched to a controller reset level.

In one preferable embodiment, wherein the post-controller signal generation circuit receives a phase node voltage of the power stage circuit as a signal related to the driver signal to indicate information of the driver signal.

In one preferable embodiment, the power stage circuit includes a synchronous or non-synchronous buck, boost, inverting, buck-boost, inverting-boost, or flyback power stage circuit.

In one preferable embodiment, the predetermined minimum duty ratio is zero.

In one preferable embodiment, the input voltage has a semi-sinusoidal waveform.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations among the circuits and among the signals; the circuit sizes, the signal waveforms, and the frequencies of the signals are not drawn in actual scale.

Figure 2A:
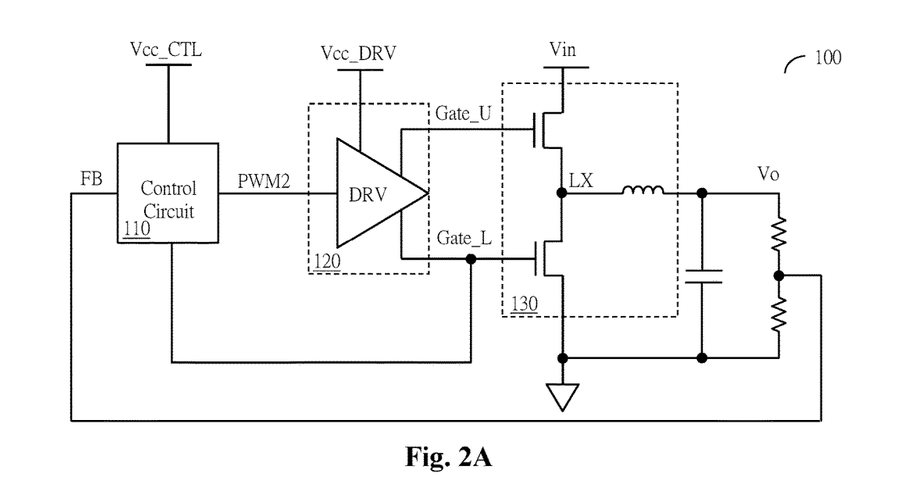
FIGS. 2A and 2B show a first embodiment of the present invention.
Figure 2B:
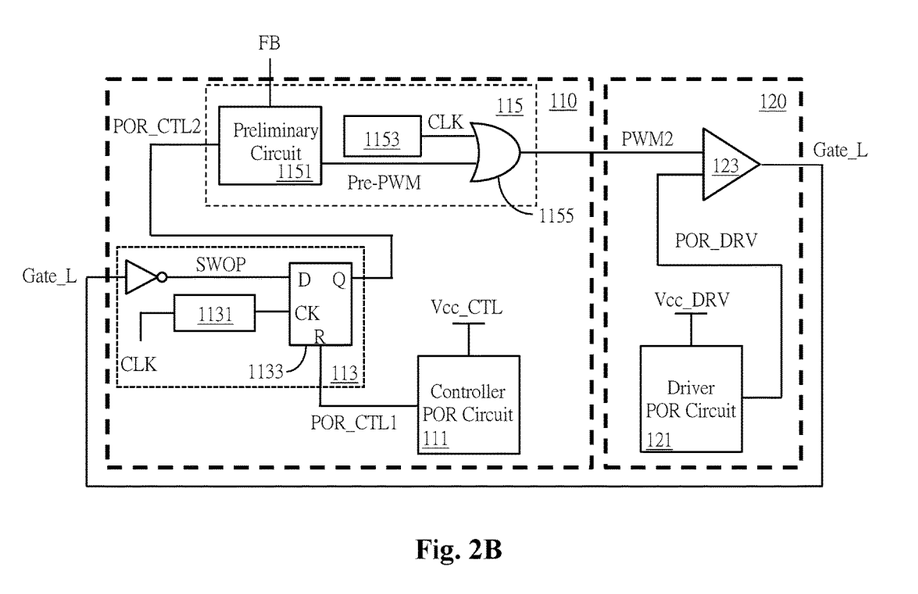

FIGS. 2A and 2B show a first embodiment of the present invention. As shown in FIG. 2A, a switching regulator 100 is configured to convert an input voltage Vin to an output voltage Vo. The switching regulator 100 includes a control circuit 110, a driver circuit 120, and a power stage circuit 130. The power stage circuit 130 controls at least one switch therein according to driver signals Gate_L and Gate_U, to convert the input voltage Vin to the output voltage Vo. The power stage circuit 130 includes, for example, a synchronous or non-synchronous buck, boost, inverting, buck-boost, inverting-boost, or flyback power stage circuit as shown in FIGS. 7A to 7K. The driver signals Gate_L and Gate_U are related to each other; for example, they may be substantially in inverted phase to each other, which is well known to a person having ordinary skill in the art, so the details thereof are not redundantly explained here.

The driver circuit 120, which is coupled between the control circuit 110 and the power stage circuit 130, includes a driver DRV that generates the driver signals Gate_L and Gate_U according to a pulse width modulation (PWM) signal PWM2. The control circuit 110, which is coupled to the power stage circuit 130 through the driver circuit 120, generates the PWM signal PWM2 according to a feedback FB related to the output voltage Vo and the driver signal Gate_L. Referring to FIG. 2B and also referring to FIGS. 5A to 5C, the control circuit 110 includes, for example, a controller power ON reset (POR) circuit 111, a controller post-POR signal generation circuit 113, and a PWM signal generation circuit 115. The controller POR circuit 111 is configured to switch a controller pre-POR signal POR_CTL1 to a controller reset-accomplished level (such as but not limited to the high level) when the voltage level of the controller voltage supply Vcc_CTL rises above the controller POR rising threshold Vctl_R. The controller post-POR signal generation circuit 113 is coupled to the controller POR circuit 111 and the driver circuit 120. After the controller pre-POR signal POR_CTL1 is switched to the controller reset-accomplished level, in one embodiment, the controller post-POR signal generation circuit 113 receives the driver signal Gate_L and switches the controller post-POR signal POR_CTL2 to a ready level (for example but not limited to the high level) according to the driver signal Gate_L, for example after the driver signal Gate_L starts switching levels to operate the power switch in the power stage circuit 130 according to the PWM signal PWM2.

Still referring to FIG. 2B, the PWM signal generation circuit 115 generates the PWM signal PWM2 according to the feedback signal FB related to the output voltage Vo and the controller post-POR signal POR_CTL2. The PWM signal generation circuit 115 switches the duty ratio of the PWM signal PWM2 to a predetermined minimum duty ratio before the controller pre-POR signal POR_CTL1 is switched to the controller reset-accomplished level and the controller post-POR signal POR_CTL2 is switched to the ready level. The predetermined minimum duty ratio of the PWM signal PWM2 can be a minimum duty ratio that is controllable by the switching regulator 100. The PWM signal PWM2 may be, for example but not limited to, the clock signal CLK as shown in FIG. 2B. The clock signal CLK is, for example but not limited to, a pulse signal generated according to a constant period generated by the clock signal generation circuit 1153.

Figure 4:
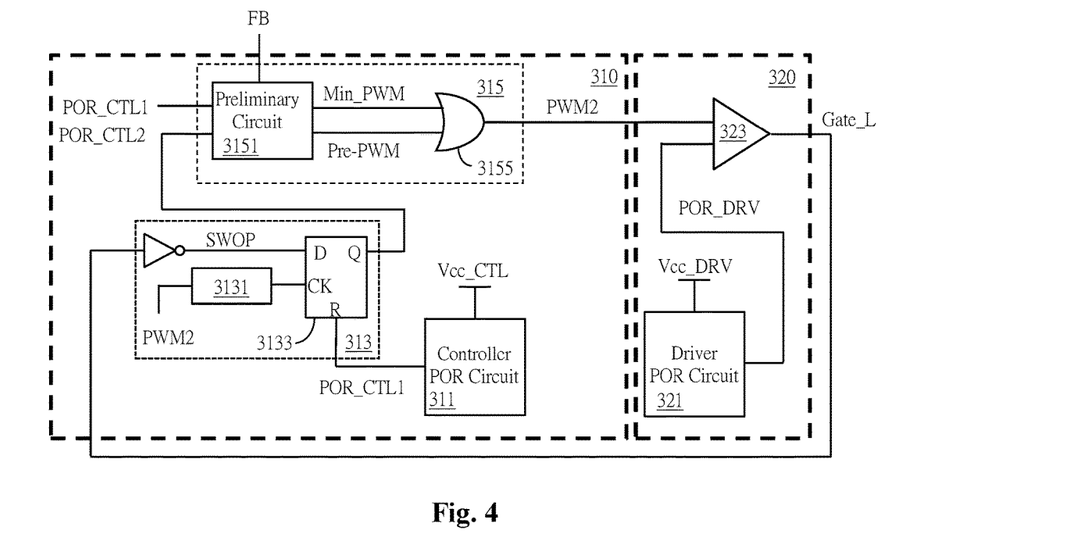
FIG. 4 shows a third embodiment of the present invention.

Note that the predetermined minimum duty ratio can be zero, that is, before the controller pre-POR signal POR_CTL1 is switched to the controller reset-accomplished level and the controller post-POR signal POR_CTL2 is switched to the ready level, the duty ratio of the PWM signal PWM2 can be zero so that there is no PWM pulse. That is, even if the controller POR circuit 111 has switched the controller pre-POR signal POR_CTL1 to the controller reset-accomplished level, as long as it is not confirmed that the driver circuit 120 has started operation, the PWM signal generation circuit 115 can set the PWM signal PWM2 to zero. It is after the driver circuit 120 has been confirmed to be in normal operation that the PWM signal generation circuit 115 starts generating the PWM signal according to the feedback signal FB. To generate the zero duty ratio PWM signal PWM2 be zero, FIG. 4 shows an example which will be explained later. In addition, the predetermined minimum duty ratio may be any predetermined duty ratio that is lower than the duty ratio determined by loop feedback control.

Still referring to FIG. 2B, the driver circuit 120 includes, for example but not limited to, a driver POR circuit 121 and a driver signal generation circuit 123. The driver POR circuit 121 is configured to switch the driver POR signal POR_DRV to the driver reset-accomplished level (for example but not limited to the high level) when the voltage level of the driver voltage supply Vcc_DRV rises above the driver POR rising threshold Vdrv_R. The driver signal generation circuit 123 is coupled to the driver POR circuit 121 and the PWM signal generation circuit 115, and is configured to generate the driver signals Gate_L and Gate_U according to the driver POR signal POR_DRV and the PWM signal PWM2.

Still referring to FIG. 2B, the controller post-POR signal generation circuit 113 includes, for example, a latch circuit 1133. In a more specific embodiment, the latch circuit 1133 is, for example but not limited to, a D-type flip-flop as shown in the figure. The D-type flip-flop includes a reset pin R which is reset according to the controller pre-POR signal POR_CRL1, and the D-type flip-flop latches a switching operation signal (SWOP) related to the driver signal Gate_L according to the clock signal CLK, to generate the controller post-POR signal POR_CLT2. In one embodiment, the clock signal CLK passes through a delay circuit 1131 to generate a delayed clock signal so as to be synchronized with the switching operation signal SWOP, and the clock pin CK of the D-type flip-flop receives the delayed clock signal. The D-type flip-flop latches the switching operation signal SWOP received by a pin D, and outputs the controller post-POR signal POR_CLT2 through a pin Q.

Still referring to FIG. 2B, the PWM signal generation circuit 115 includes, for example, a preliminary circuit 1151, a clock signal generation circuit 1153, and a determination circuit 1155. The preliminary circuit 1151 is coupled to the controller post-POR signal generation circuit 113, and generates a preliminary PWM signal Pre-PWM according to the controller post-POR signal POR_CTL2 and the feedback signal FB. The determination circuit 1155, which is coupled to the preliminary circuit 1151 and the clock signal generation circuit 1153, is configured to generate the PWM signal PWM2 according to the preliminary PWM signal Pre-PWM and the clock signal CLK. After the control circuit 110 and the driver circuit 120 complete their respective POR processes, the preliminary circuit 1151 generates a PWM signal according to the feedback signal FB, for controlling the power switch in the power stage to convert the input voltage to the output. However, before the controller post-POR signal POR_CTL2 has not been switched to the ready level, the preliminary PWM signal Pre-PWM generated by the preliminary circuit 1151 stays for example at a low level. The determination circuit 1155, in a more specific embodiment, is a logic circuit, which includes for example but not limited to an OR gate as shown in figure; before the controller pre-POR signal POR_CTL1 is switched to the controller reset-accomplished level and the controller post-POR signal POR_CTL2 is switched to the ready level, the determination circuit 1155 selects the clock signal CLK as the PWM signal PWM2, thereby setting the duty ratio of the PWM signal PWM2 to the predetermined minimum duty ratio.

In addition to setting the duty ratio of the PWM signal PWM2 to the predetermined minimum duty ratio before the controller pre-POR signal POR_CTL1 is switched to the controller reset-accomplished level and the controller post-POR signal POR_CTL2 is switched to the ready level, in one embodiment accordance to the present invention, when the voltage level of the controller voltage supply Vcc_CTL falls below the controller POR falling threshold Vctl_F, the controller POR circuit 111 switches the controller pre-POR signal POR_CTL1 to the controller reset level (e.g., the low level), and the controller post-POR_signal generation circuit 113 switches the controller post-POR signal POR_CTL2 to a not-ready level (e.g., the low level); and when the voltage level of the driver voltage supply Vcc_DRV falls below the driver POR falling threshold Vdrv_F, the driver POR circuit 121 switches the driver POR signal POR_DRV to the driver reset level (for example, the low level). In a preferable embodiment, after the POR signal POR_DRV is switched to the driver reset level and before the controller pre-POR signal POR_CTL1 is switched to the controller reset level, the PWM signal generation circuit 115 sets the duty ratio of the PWM signal PWM2 to the predetermined minimum duty ratio.

In one embodiment, the input voltage Vin has a semi-sinusoidal waveform, and the switching regulator 100 is an AC/DC conversion circuit (AC/DC), that is, an AC voltage is converted by a rectifier circuit to generate the input voltage Vin which has a full-wave rectified semi-sinusoidal waveform or a half-wave rectified semi-sinusoidal waveform. This may cause the errors that may occur in the controller POR rising threshold Vctl_R, the driver POR rising threshold Vdrv_R, the controller POR falling threshold Vctl_F, and the driver POR falling threshold Vdrv_F to become larger in the prior art. Therefore, if the present invention is applied to an AC/DC converter circuit, it will result in more significant improvements, particularly in reducing the power consumption and the flexibility in setting the POR rising and falling thresholds.

Figure 3:
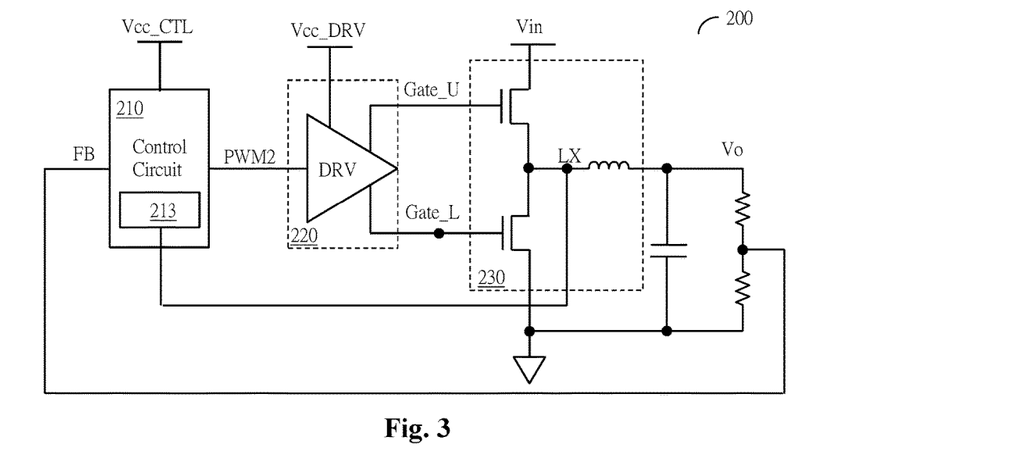
FIG. 3 shows a second embodiment of the present invention.

FIG. 3 shows a second embodiment of the present invention. As shown in the figure, the switching regulator 200 includes a control circuit 210, a driver circuit 220, and a power stage circuit 230. The difference between this embodiment and the first embodiment is that, in this embodiment, the controller post-POR signal generation circuit 213 of the control circuit 210 receives a phase node voltage LX in the power stage circuit 230, as a signal related to the driver signal to indicate information of the driver signal Gate_L. This embodiment illustrates that, according to the present invention, any signal which is indicative of whether the driver signal starts switching levels to operate the power stage switch in the power stage circuit 230 can be used as a signal related to the driver signal Gate_L, and such a signal can be inputted to the controller post-POR signal generation circuit 213 such that, after the controller pre-POR signal POR_CTL1 is switched to the controller reset-accomplished level and the driver signal Gate_L starts switching levels to operate the power switch according to the PWM signal PWM2, the controller post-POR signal generation circuit 213 switches the controller post-POR signal POR_CTL2 to the ready level.

FIG. 4 shows a third embodiment of the present invention. The present invention shows a more specific embodiment of the control circuit 310 and the driver circuit 320. As shown in the figure, the driver circuit 320 is coupled to the control circuit 310, for generating a driver signal Gate_L according to the PWM signal PWM2. The control circuit 310 is coupled to the driver circuit 320, and generates the PWM signal PWM2 according to the feedback signal FB related to the output voltage Vo and the driver signal Gate_L. As shown in FIG. 4 and referring to FIGS. 5A-5C at the same time, the control circuit 310 includes, for example, a controller power-ON reset (POR) circuit 311, a controller post-POR signal generation circuit 313, and a PWM signal generation circuit 315. The controller POR circuit 311 is configured to switch the controller pre-POR signal POR_CTL1 to the controller reset-accomplished level (for example but not limited to the high level) when the voltage level of the controller voltage supply Vcc_CTL rises above the controller POR rising threshold Vctl_R. The controller post-POR signal generation circuit 313 is coupled to the controller POR circuit 311, the PWM signal generation circuit 315 and the driver circuit 320. In one embodiment, the controller post-POR signal generation circuit 313 receives the driver signal Gate_L, and after the controller pre-POR signal POR_CTL1 is switched to the controller reset-accomplished level and the driver signal Gate_L starts switching levels to operate the power switch in the power stage circuit according to the PWM signal PWM2, the controller post-POR signal generation circuit 313 switches the controller post-POR signal POR_CTL2 to the ready Level (for example but not limited to the high level).

In this embodiment, the controller post-POR signal generation circuit 313 includes, for example, a latch circuit 3133. In a more specific embodiment, the latch circuit 3133 is, for example but not limited to, a D-type flip-flop as shown in FIG. 4. The D-type flip-flop includes a reset pin R which is reset according to the controller pre-POR signal POR_CRL1, and the D-type flip-flop latches a switching operation signal (SWOP) related to the driver signal Gate_L according to the PWM signal PWM2, to generate the controller post-POR signal POR_CLT2. In one embodiment, the PWM signal PWM2 passes through a delay circuit 3131 to generate a delayed signal so as to be synchronized with the switching operation signal SWOP, and the clock pin CK of the D-type flip-flop receives the delayed signal. The D-type flip-flop latches the switching operation signal SWOP received by a pin D, and outputs the controller post-POR signal POR_CLT2 through a pin Q.

Still referring to FIG. 4, the PWM signal generation circuit 315 generates the PWM signal PWM2 according to the feedback signal FB related to the output voltage Vo, the controller pre-POR signal POR_CTL1 and the controller post-POR signal POR_CTL2. The PWM signal generation circuit 315 sets the duty ratio of the PWM signal PWM2 to the predetermined minimum duty ratio before the controller pre-POR signal POR_CTL1 is switched to the controller reset-accomplished level and the controller post-POR signal POR_CTL2 is switched to the ready level. This embodiment is different from the first embodiment in that, after the POR process of the control circuit 310 POR is completed, the preliminary circuit 3151 generates a minimum PWM signal Min_PWM according to, for example but not limited to, the controller pre-POR signal POR_CTL1. The minimum PWM signal Min_PWM has the predetermined minimum duty ratio, and is used as the clock signal CLK in FIG. 2B, wherein the predetermined minimum duty ratio is a minimum duty ratio controllable by the control circuit 310 to limit the duty ratio of the PWM signal.

Still referring to FIG. 4, the driver circuit 320 includes, for example but not limited to, a driver POR circuit 321 and a driver signal generation circuit 323. The driver POR circuit 321 is configured to switch the driver POR signal POR_DRV to the driver reset-accomplished level (for example but not limited to the high level) when the voltage level of the driver voltage supply Vcc_DRV rises above the driver POR rising threshold Vdrv_R. The driver signal generation circuit 323 is coupled to the driver POR circuit 321 and the PWM signal generation circuit 315, and is configured to generate the driver signal Gate_L according to the driver POR signal POR_DRV and the PWM signal PWM2.

Figure 5A:
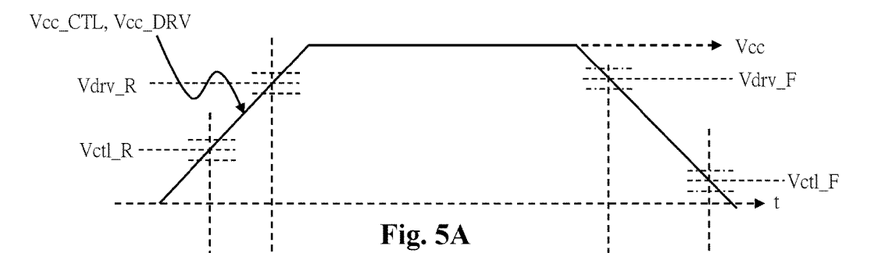
FIGS. 5A to 5C show schematic diagrams of the characteristic curves of the present invention.

The present invention is superior to the prior art in many respects. First, taking the first embodiment of the present invention as an example, and referring to the signal waveforms shown in FIGS. 5A-5C, in the switching regulator 100, when the control circuit 110 and the driver circuit 120 are in the POR process, and, as shown in FIG. 5A, if the controller pre-POR signal POR_CTL1 is switched to the controller reset-accomplished level before the driver POR signal POR_DRV is switched to the driver reset-accomplished level, i.e., the time point T1 is earlier than time point t2, then, according to the present invention, before the control circuit 110 confirms that the driver signals Gate_L and Gate_U of the driver circuit 120 can start switching levels to operate the power switch in the power stage circuit 130 according to the PWM signal PWM2, that is, after the controller pre-POR_CTL1 is switched to the controller reset-accomplished level but before the controller post-POR signal is switched to the ready level, the duty ratio of the PWM signal PWM2 is set to the predetermined minimum ratio, as shown by the waveform of the PWM signal PWM2 illustrated in FIG. 5C. Therefore, the duty ratio of the PWM signal PWM2 will not be too high before the feedback signal FB can correctly indicate the output voltage Vo, to avoid generating excessive inrush current. As such, in the present invention, it is not required for the driver circuit 120 to complete its start-up operation before the control circuit 110 completes its start-up operation. Compared with the prior art, in the switching regulator of the present invention, it is not required to set the controller POR rising threshold Vctl_R higher than the driver POR rising threshold Vdrv_R, and it is not required to provide a safe margin (the voltage difference Vctl_R) between the controller POR rising threshold Vctl_R and the driver POR rising threshold; regardless which of the POR processes of the control circuit 110 and driver circuit 120 is completed earlier, the present invention can ensure proper operation without inrush current problem, thus improving the application range of the switching regulator.

It should be noted that, in the first embodiment, the latch circuit 1133 is a D-type flip-flop whose reset pin R is reset according to the controller pre-POR_signal POR_CRL1, and the latch circuit 1133 latches the switching operation signal SWOP related to the driver signal Gate_L to generate the controller post-POR signal POR_CLT2 according to the clock signal CLK. Therefore, in the POR process, the controller post-POR signal POR_CLT2 needs to wait for the rising edge or the falling edge of the next clock signal CLK, that is, the time point T5 is shown in FIG. 5A, to switch its level.

Figure 5B:
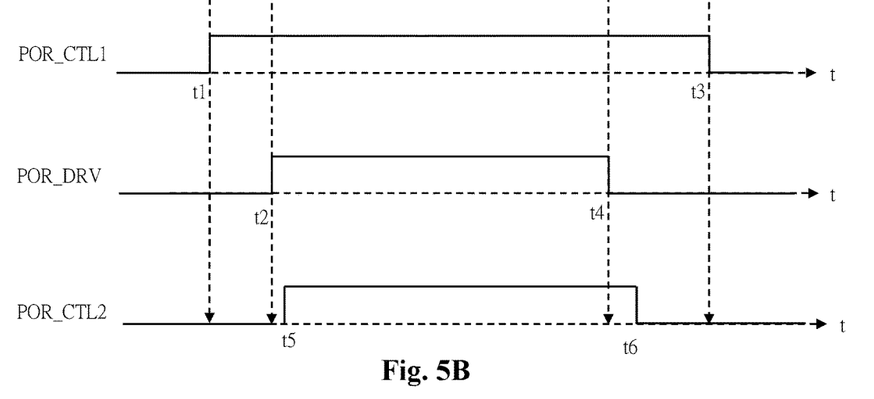
Figure 5C:
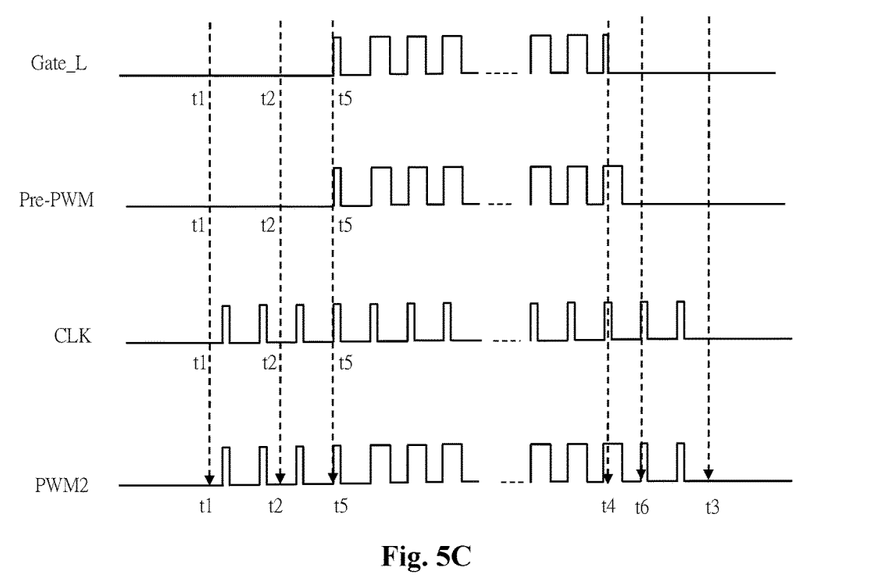

On the other hand, still taking the first embodiment as an example, and referring to the signal waveforms shown in FIGS. 5A-5C, in the switching regulator 100, when the control circuit 110 and the driver circuit 120 are powered off, and, as shown in FIG. 5A, if the controller pre-POR signal POR_CTL1 is switched to the controller reset level after the driver POR signal POR_DRV is switched to the driver reset level, i.e., the time point t3 is later than the time point t4, then, in the power off process of the switching regulator 100, the controller POR circuit 121 switches the controller pre-POR signal POR_CTL1 to the controller reset level (for example but not limited to the low level) when the voltage level of the controller voltage supply Vcc_CTL falls below the controller POR falling threshold Vctl_F at the time point t3, and the driver POR circuit 121 switches the driver POR signal POR_DRV to the driver POR falling threshold Vdrv_F when the voltage level of the driver voltage supply Vcc_DRV falls below the driver POR falling threshold Vdrv_F. The controller post-POR signal generation circuit 113 switches the controller post-POR signal POR_CTL2 to the not-ready level (for example but not limited to, the low level) according to the operation signal Gate_L after the driver POR signal POR_DRV is switched to the driver reset level, at the rising edge (or falling edge) of the next clock signal CLK.

In other words, when the control circuit 110 confirms that the driver signal Gate_L of the driver circuit 120 stops switching levels to operate the power switch according to the PWM signal PWM2 (the driver signal Gate_L does not switch levels after it is switched to the low level), that is, after the driver POR signal POR_DRV is switched to the driver reset level, and that the controller post-POR signal POR_CTL2 is switched to the not-ready level, the control circuit 110 sets the duty ratio of the PWM signal PWM2 to the predetermined minimum duty ratio until the controller pre-POR signal POR_CTL1 is switched to the controller reset level. Therefore, it is not required for the power off process of the driver circuit 120 to be completed after the power off process of the control circuit.

Moreover, in the prior art, even though the controller POR rising threshold Vctl_R is set higher than the driver POR rising threshold Vdrv_R, it does not absolutely ensure that the start-up operation of the driver circuit is completed before the start-up operation of the control circuit is completed; likely, in the prior art, even though the controller POR falling threshold Vctl_F is set higher than the driver POR falling threshold Vdrv_F, it does not absolutely ensure that the power off operation of the driver circuit is completed after the power off operation the control circuit is completed.

Figures 6A, 6B:
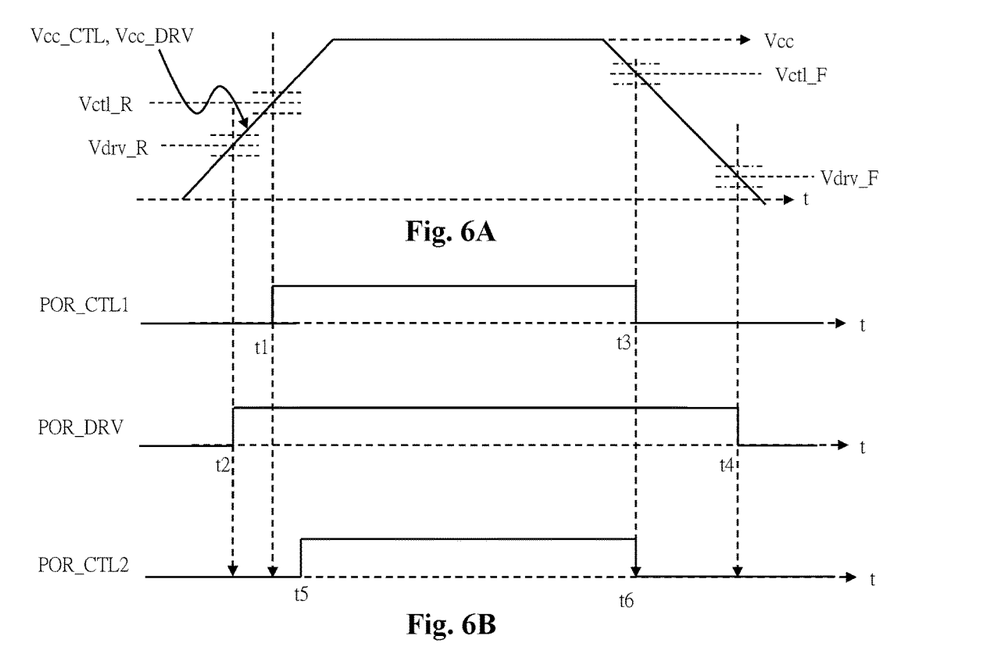
FIGS. 6A~6C show schematic diagrams of the characteristic curves of the present invention.
Figure 6C:
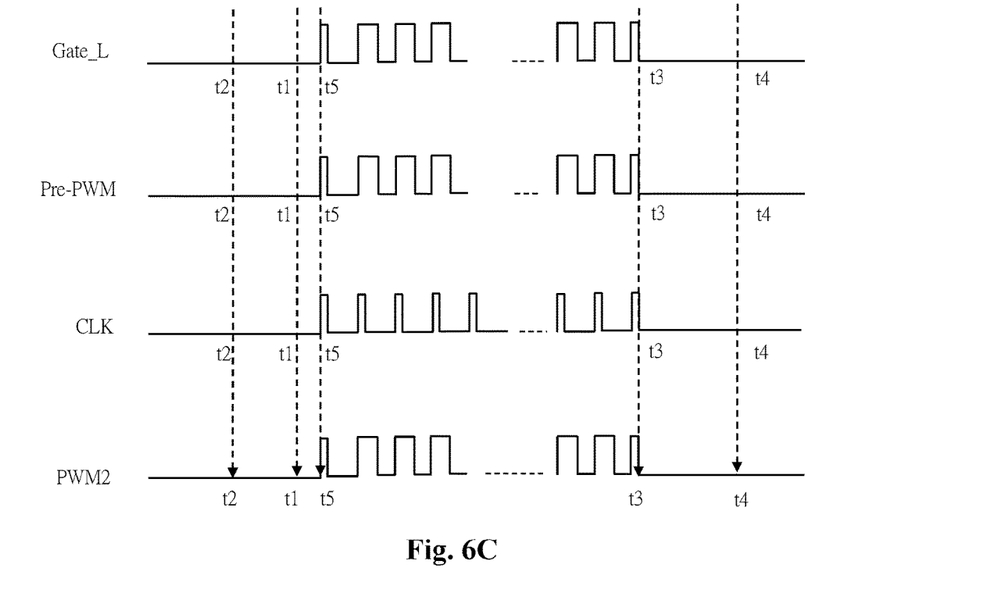
Figure 7A:
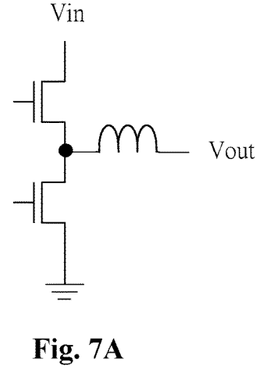
FIGS. 7A to 7K show synchronous and non-synchronous buck, boost, inverting, buck-boost, inverting-boost, and flyback power stage circuits.
Figure 7B:
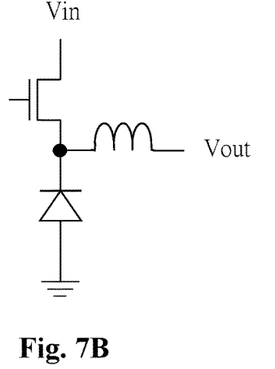
Figure 7C:
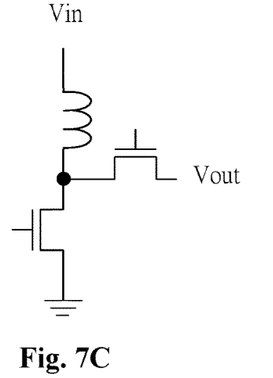
Figure 7D:
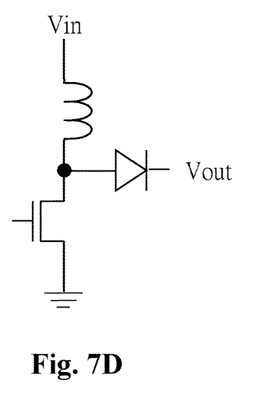
Figure 7E:
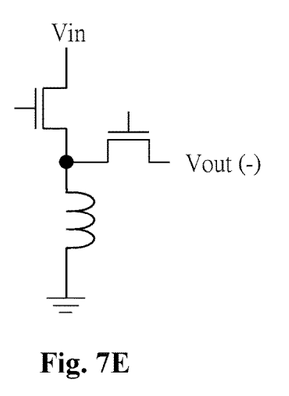
Figure 7F:
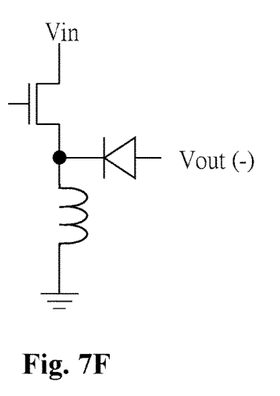
Figure 7G:
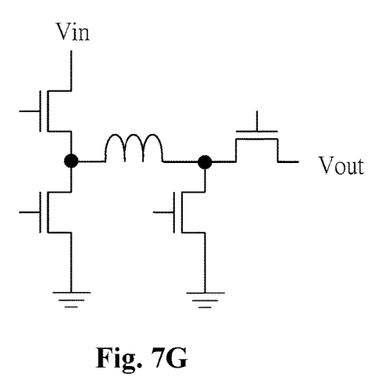
Figure 7H:
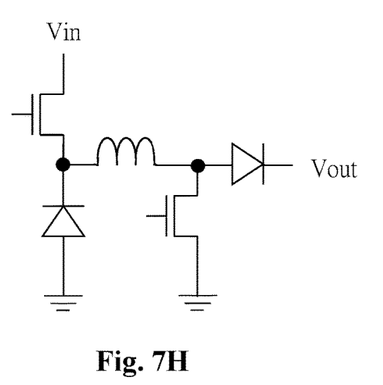
Figure 7I:
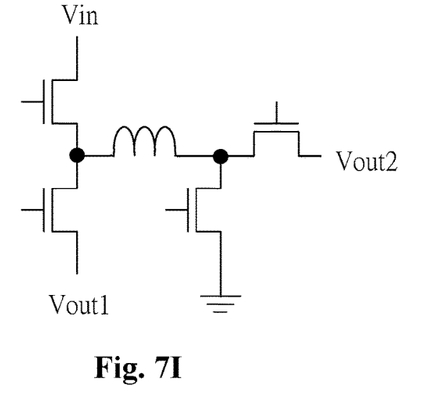
Figure 7J:
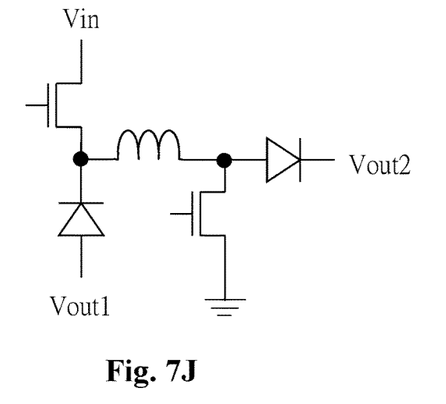
Figure 7K:
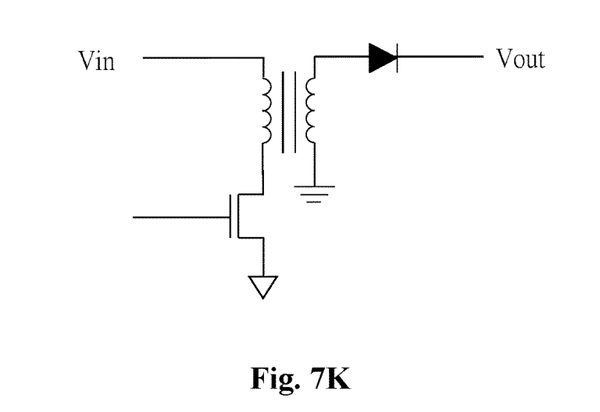

Please refer to the diagrams of FIGS. 6A-6C; FIGS. 6A-6C show another possible scenario according to the present invention. As shown in the figure, in the switching regulator of the present invention, if the time point at which the voltage level of the controller voltage supply Vcc_CTL rises above the controller POR rising threshold Vctl_R is later than the time point at which the voltage level of the driver voltage supply Vcc_DRV rises above the driver POR rising threshold Vdrv_R (i.e., t1 later than t2), and/or, the time point at which the controller voltage supply Vcc_CTL falls below the controller POR falling threshold Vctl_F is earlier than the time point at which the driver voltage supply Vcc_DRV falls below the driver POR falling threshold Vdrv_F (i.e., t3 earlier than t4), the circuit can still operate normally; there is no inrush current problem, and the circuit will not erroneously trigger a false protection mechanism.

Taking the first embodiment of the present invention as an example, and referring to the signal waveforms shown in FIGS. 6A-6C, in the switching regulator 100, when the control circuit 110 and the driver circuit 120 are in the POR process, and, as shown in FIG. 6A, if the controller pre-POR signal POR_CTL1 is switched to the controller reset-accomplished level after the driver POR signal POR_DRV is switched to the driver reset-accomplished level, i.e., the time point t1 is later than time point t2, then, according to the present invention, because the start-up operation of the control circuit 110 is later than the start-up operation of the driver circuit 120, before the control circuit 110 confirms that the driver signals Gate_L and Gate_U of the driver circuit 120 can start switching levels to operate the power switch in the power stage circuit 130 according to the PWM signal PWM2, the controller pre-POR signal POR_CTL1 will remain at the controller reset level, and the PWM signal PWM2 will remain at the low level without operating the power switch, as shown by the waveform of the PWM signal PWM2 illustrated in FIG. 6C.

In this way, before the feedback signal FB has not correctly indicated the output voltage Vo, it is even less likely for the duty ratio of the PWM signal PWM2 to be too high to generate a massive inrush current. Therefore, according to the present invention, regardless of when the start-up operation of the driver circuit 120 is completed, there is no inrush current problem before start-up operation of the control circuit is completed. Thus, compared with the prior art, the switching regulator of the present invention does not need to take into account the voltage difference between the controller POR rising threshold Vctl_R and the driver POR rising threshold Vdrv_R, and it can be ensured that there is no inrush current and other problems regardless of the order of completions of the POR processes of the control circuit and the driver circuit, so the present invention is more advantageous.

It should be noted that, in the first embodiment, the latch circuit 1133 is a D-type flip-flop whose reset pin R is reset according to the controller pre-POR signal POR_CRL1, and the latch circuit 1133 latches the switching operation signal SWOP related to the driver signal Gate_L to generate the controller post-POR signal POR_CLT2 according to the clock signal CLK. Therefore, in the POR process, the controller post-POR signal POR_CLT2 needs to wait for the rising edge or the falling edge of the next clock signal CLK, that is, the time point t5 as shown in FIG. 6A, to switch its level.

On the other hand, for example, according to the first embodiment of the present invention, and referring to the related characteristic curves diagrams shown in FIGS. 6A-6C, in the switching regulator 100, the control circuit 110 and the driver circuit 120 are powered off. It is considered that the controller pre-POR signal POR_CTL1 is switched to the controller reset level, and the driver POR signal POR_DRV is switched to the driver reset level. As shown in FIG. 6A, the time point t3 is earlier than the time point t4. In the switching regulator 100, when the control circuit 110 and the driver circuit 120 are in the power off operation, the controller POR circuit 121 switches the controller pre-POR signal POR_CTL1 to the controller reset level (for example but not limited to the low level) when the voltage level of the controller voltage supply Vcc_CTL falls below the controller POR falling threshold Vctl_F at the time point t3, and the driver POR circuit 121 switches the driver POR signal POR_DRV to the driver reset level when the voltage level of the driver voltage supply Vcc_DRV falls below the driver POR falling threshold Vdrv_F at the time point t4. After the controller POR signal POR_CTL is switched to the driver reset level, the controller post-POR POR signal generation circuit 113 resets the latch circuit 1133 and switches the controller post-POR signal POR_CTL2 to the not-ready level (for example, not limited to the low level). In other words, after the controller POR signal POR_CTL is switched to the driver reset level, the control circuit 110 will switch the PWM signal PWM2 to a zero voltage; as such, the circuit will not erroneously trigger a false protection mechanism.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. The various embodiments described above are not limited to being used alone; two embodiments may be used in combination, or a part of one embodiment may be used in another embodiment. As an example, in different cases, the time points t1, t2, t3 and t4 may be different from what are shown in FIGS. 5A-5C and 6A-6C. For example, in the POR process, the controller pre-POR signal POR_CTL1 may be switched to the controller reset-accomplished level before the driver POR signal POR_DRV is switched to the driver reset-accomplished level, that is, the time point t1 may be earlier than the time point t2. During power off, the controller pre-POR signal POR_CTL1 may be switched to the controller reset level before the driver POR signal POR_DRV is switched to the driver reset level, that is, the time point t3 may be earlier than the time point t4. The present invention is applicable to all such cases. In addition, in the spirit of the invention, those skilled in the art can think of various equivalent variations and various combinations. For example, in the context of the present invention, "processing, or operating a certain signal", or "generating a certain output result according to a certain signal", is not limited to performing an action based on the signal itself, but may be performing an action based on the signal in a converted form; for example, the signal may be processed by voltage-current conversion, current-voltage conversion, and/or scaling, etc., and the converted signal is processed or operated, or a certain output result is generated according to the converted signal. Therefore, the scope of the present invention should include such variations.

What is claimed is:

1. A switching regulator, which is configured to operably convert an input voltage to an output voltage, the switching regulator comprising:
    a power stage circuit, which is configured to operably control at least one power switch therein to convert the input voltage to the output voltage according to a driver signal;
    a driver circuit, which is coupled to the power stage circuit, and is configured to generate the driver signal according to a pulse width modulation (PWM) signal; and
    a control circuit, which is coupled to the driver circuit and the power stage circuit, the control circuit including:
        a controller power ON reset (POR) circuit, which is configured to switch a pre-controller signal POR to a controller reset-accomplished level when a voltage level of a controller voltage supply rises above a controller POR rising threshold;
        a controller post-POR_signal generation circuit, which is coupled to the controller POR circuit and the driver circuit, wherein after the controller pre-POR signal is switched to the controller reset-accomplished level, the controller post-POR signal generation circuit is configured to switch a controller post-POR_signal to a ready level according to the driver signal after the driver signal starts switching levels according to the PWM signal to operate the power switch; and
        a PWM signal generation circuit, which is configured to generate the PWM signal according to a feedback signal related to the output voltage and the controller post-POR_signal;
        wherein the PWM signal generation circuit sets a duty ratio of the PWM signal to a predetermined minimum duty ratio after the controller pre-POR_signal is switched to the controller reset-accomplished level and before the controller post-POR_signal is switched to the ready level.

2. The switching regulator of claim 1, wherein the driver circuit includes:
    a driver POR circuit, which is configured to switch a driver POR_signal to a driver reset-accomplished level when a voltage level of a driver voltage supply rises above a controller driver rising threshold; and
    a driver signal generation circuit, which is coupled to the driver POR circuit and the PWM signal generation circuit, and is configured to generate the driver signal according to the driver POR_signal and the PWM signal.

3. The switching regulator of claim 2, wherein the driver POR circuit switches the driver POR_signal to a driver reset level when the voltage level of the driver voltage supply falls below a driver POR falling threshold, and the PWM generation circuit sets the duty of the PWM signal to the predetermined minimum duty ratio after the driver POR_signal is switched to the driver reset level and before the controller pre-POR signal is switched to a controller reset level.

4. The switching regulator of claim 1, wherein the controller post-POR_signal generation circuit includes a latch circuit, wherein the latch circuit is reset according to the controller pre-POR_signal, and is configured to latch a switching operation signal related to the driver signal according to a clock signal, so as to generate the controller post-POR signal.

5. The switching regulator of claim 4, wherein the clock signal includes the PWM signal.

6. The switching regulator of claim 1, wherein the PWM signal generation circuit includes:
    a preliminary circuit, which is coupled to the controller post-POR_signal generation circuit, and is configured to generate a preliminary signal according to the controller post-POR_signal and the feedback signal; and
    a determination circuit, which is coupled to the preliminary circuit, and is configured to generate the PWM signal according to the preliminary PWM signal and a clock signal.

7. The switching regulator of claim 6, wherein the preliminary circuit is further coupled to the controller POR circuit and is further configured to generate a minimum PWM signal as the clock signal according to the controller pre-POR_signal so that the determination circuit sets the duty ratio of the PWM signal to the predetermined minimum duty ratio before the controller post-POR_signal is switched to the ready level.

8. The switching regulator of claim 1, wherein when the voltage level of the controller voltage supply falls below a controller POR falling threshold, the controller POR circuit switches the controller pre-POR_signal to a controller reset level and the post-controller generation circuit switches the controller POR_signal to a not-ready level.

9. The switching regulator of claim 1, wherein the post-controller signal generation circuit receives a phase node voltage of the power stage circuit as a signal related to the driver signal to indicate information of the driver signal.

10. The switching regulator of claim 1, wherein the power stage circuit includes a synchronous or non-synchronous buck, boost, inverting, buck-boost, inverting-boost, or flyback power stage circuit.

11. The switching regulator of claim 1, wherein the predetermined minimum duty ratio is zero.

12. The switching regulator of claim 1, wherein the input voltage has a semi-sinusoidal waveform.

13. A control circuit for a switching regulator, wherein the switching regulator is configured to convert an input voltage to an output voltage, the switching regulator comprising: a power stage circuit, which is configured to switch a least power switch according to a driver signal to convert the input voltage to the output voltage; a driver circuit, which is coupled to the power stage circuit, and is configured to generate the driver signal according to a pulse width modulation (PWM) signal; and the control circuit, the control circuit comprising:
 a controller power ON reset (POR) circuit, which is configured to switch a pre-controller signal POR to a controller reset-accomplished level when a voltage level of a controller voltage supply rises above a controller POR rising threshold;
 a controller post-POR_signal generation circuit, which is coupled to the controller POR circuit and the driver circuit, wherein after the controller pre-POR_signal is switched to the controller reset-accomplished level, the controller post-POR_signal generation circuit is configured to switch a controller post-POR_signal to a ready level according to the driver signal after the driver signal starts switching levels according to the PWM signal to operate the power switch; and
 a PWM signal generation circuit, which is configured to generate the PWM signal according to a feedback signal related to the output voltage and the controller post-POR_signal;
 wherein the PWM signal generation circuit sets a duty ratio of the PWM signal to a predetermined minimum duty ratio after the controller pre-POR_signal is switched to the controller reset-accomplished level and before the controller post-POR signal is switched to the ready level.

14. The control circuit of claim 13, wherein the driver circuit includes:
 a driver POR circuit, which is configured to switch a driver POR_signal to a driver reset-accomplished level when a voltage level of a driver voltage supply rises above a controller driver rising threshold; and
 a driver signal generation circuit, which is coupled to the driver POR circuit and the PWM signal generation circuit, and is configured to generate the driver signal according to the driver POR_signal and the PWM signal.

15. The control circuit of claim 14, wherein the driver POR circuit switches the driver POR_signal to a driver reset level when the voltage level of the driver voltage supply falls below a driver POR falling threshold, and the PWM signal generation circuit sets the duty of the PWM signal to the predetermined minimum duty ratio after the driver POR_signal is switched to the driver reset level and before the controller pre-POR signal is switched to a controller reset level.

16. The control circuit of claim 13, wherein the controller post-POR_signal generation circuit includes a latch circuit, wherein the latch circuit is reset according to the controller pre-POR_signal, and is configured to latch a switching operation signal related to the driver signal according to a clock signal, so as to generate the controller post-POR signal.

17. The control circuit of claim 16, wherein the clock signal includes the PWM signal.

18. The control circuit of claim 13, wherein the PWM signal generation circuit includes:
 a preliminary circuit, which is coupled to the controller post-POR_signal generation circuit, and is configured to generate a preliminary signal according to the controller post-POR_signal and the feedback signal; and
 a determination circuit, which is coupled to the preliminary circuit, and is configured to generate the PWM signal according to the preliminary PWM signal and a clock signal.

19. The control circuit of claim 18, wherein the preliminary circuit is further coupled to the controller POR circuit and is further configured to generate a minimum PWM signal as the clock signal according to the controller pre-POR_signal so that the determination circuit sets the duty ratio of the PWM signal to the predetermined minimum duty ratio before the controller post-POR_signal is switched to the ready level.

20. The control circuit of claim 13, wherein when the voltage level of the controller voltage supply falls below a controller POR falling threshold, the controller POR circuit switches the controller pre-POR_signal to a controller reset level and the post-controller generation circuit switches the controller POR_signal to a not-ready level.

21. The control circuit of claim 13, wherein the post-controller signal generation circuit receives a phase node voltage of the power stage circuit as a signal related to the driver signal to indicate information of the driver signal.

22. The control circuit of claim 13, wherein the power stage circuit includes a synchronous or non-synchronous buck, boost, inverting, buck-boost, inverting-boost, or flyback power stage circuit.

23. The control circuit of claim 13, wherein the predetermined minimum duty ratio is zero.

24. The control circuit of claim 13, wherein the input voltage has a semi-sinusoidal waveform.

* * * * *